United States Patent [19]
Kawai et al.

[11] Patent Number: 5,626,982
[45] Date of Patent: May 6, 1997

[54] HEAT INSULATING PAD MATERIAL, PARTICULARLY FOR USE IN BATTERY SHIELD AND MANUFACTURE OF THE SAME

[75] Inventors: Tamotsu Kawai, Shiga; Masao Ando, Hyogo; Masahiro Chikada; Yoshihiro Yamamoto, both of Osaka, all of Japan

[73] Assignee: Kanegafuchi Chemical Industry Co., Ltd., Osaka, Japan

[21] Appl. No.: 394,575

[22] Filed: Feb. 27, 1995

[51] Int. Cl.$^6$ ............ H01M 2/02; H01M 10/50; B32B 3/12
[52] U.S. Cl. ............ 429/120; 429/163; 429/176; 428/159; 428/318.6
[58] Field of Search ............ 429/120, 148, 429/163, 62; 428/159, 318.6, 319.9

[56] References Cited

U.S. PATENT DOCUMENTS

| | | | |
|---|---|---|---|
| 4,054,730 | 10/1977 | Crifasi | 429/120 |
| 4,255,502 | 3/1981 | Taylor | 429/163 |
| 4,657,811 | 4/1987 | Boyd et al. | 428/318.6 |
| 4,892,783 | 1/1990 | Brazel | 428/318.6 X |
| 5,212,025 | 5/1993 | Shibata et al. | 429/148 X |
| 5,278,002 | 1/1994 | Hiers | 429/120 X |
| 5,310,594 | 5/1994 | Holland et al. | 428/159 X |
| 5,348,778 | 9/1994 | Knipp et al. | 428/318.6 X |
| 5,449,571 | 9/1995 | Longardner et al. | 429/120 |
| 5,518,806 | 5/1996 | Eder et al. | 428/159 X |

*Primary Examiner*—Anthony Skapars
*Attorney, Agent, or Firm*—Flynn, Thiel, Boutell & Tanis, P.C.

[57] ABSTRACT

A heat insulating pad material, particularly for use in a battery shield, is made of a molded foam with a rough surface produced by in-mold expansion molding of expandable resin beads, a facing of a high-melting resin film, and an intermediate layer of a low-melting resin film. The foam and the facing are laminated together by melting the low-melting resin film in a manner that the rough surface is transparent through the facing. Upon lamination, heat may be applied onto the facing under pressure to emboss the rough surface of the molded foam, thus imparting a textured pattern. A heat insulating assembly for a battery comprises a battery case having outer surface walls and a pad of a one-piece pad member or pad members fayed and secured to the walls in a covering manner. The pad may be of the aforementioned pad material as well as molded foams produced by in-mold expansion molding or extrusion molding. The assembly may be secured by an additional fastening band, engagement of projecting members and recesses, splicing, etc.

17 Claims, 6 Drawing Sheets

HEAT INSULATING PAD MATERIAL, PARTICULARLY FOR USE IN BATTERY SHIELD AND MANUFACTURE OF THE SAME

BACKGROUND OF THE INVENTION

1. Field of the Invention

This invention relates to a method for manufacturing a heat insulating pad material having an aesthetic appearance by the use of an expansion-molded article produced through the in-mold expansion molding of expandable resin beads, and the heat insulating pad material thus manufactured. More specifically, the invention is directed to the use of a heat insulating pad material for a battery shield, and provides a heat insulating assembly for a battery, which prevents electric discharge in the winter and suppresses temperature rise in the summer.

2. Statement of Related Art

As heat insulating pad materials, plastic foams such as an urethane foam as well as a variety of materials are used generally to accommodate every use or application where heat insulation is needed.

For a battery or other objects where the prevention of electric discharge is necessitated at low temperatures in the winter and the prevention of temperature rise is necessitated at high temperatures in the high summer to avoid evapotranspiration of the electrolyte liquid, a heat insulating pad material thereof is required to have a wide variety of qualitative characteristics such as heat insulating and heat retaining properties in a wide temperature range of from low temperatures in the dead of winter to high temperatures at the height of summer, non-embrittlement and heat reserving and air tightness at low temperatures, conformity to a battery with no interstices, simplicity and swiftness of use as a battery shield at battery works, ease of removal and fitting of a discharged battery upon exchanging, resistance to oils, resistance to chemicals, resistance to high temperatures, recycling possibility, large section thickness (8 to 10 mm), economy, high-quality feeling, etc.

However, the aforesaid heat insulating pad materials used in the past cannot meet all of the qualitative characteristics mentioned above and can meet only a few of them. As examples of heat insulating assemblies for batteries required to have these characteristics, there are known a heat insulating assembly enveloped by a urethane or extruded mat around a battery and fastened thereon by a band; a heat insulating assembly covered around the outer surrounding of a battery with a heat-retaining cover made by filling polyester sponge and glass fibers within its facing and flattening the surrounding of the facing; etc.

The heat-retaining battery cover currently used is suited to heat retaining and heat insulating purposes, but has difficulties in that many steps are required for the production thereof, which necessitate a great deal of work and a high cost. Moreover, because it is made of a composite material, the cover has problems in recycling possibility and devoid of ease of mounting on and dismounting from a battery and fitness to the battery. Thus heat insulating pad materials sufficiently satisfying all of the characteristics have not yet been found.

In order to cope with the drawbacks above, the present invention has been accomplished.

Accordingly, an object of this invention is to provide a heat insulating pad material which it is easy and simple to fabricate out of a single kind of material.

Another specific object of this invention is to provide a heat insulating pad material satisfying the qualitative characteristics required for a battery shield (heat-reserving pad), viz., thereby providing a heat insulating assembly for a battery that has a beautiful appearance, enables the prevention of electric discharge in the winter and impeding of the temperature rise in the summer, thereby avoiding evapotranspiration of the electrolyte and facilitating the dismounting and mounting of the pad upon changing of a discharged battery.

The above and further objects and advantages of this invention will become more readily apparent from the following description.

SUMMARY OF THE INVENTION

The invention for attaining the aforementioned objects resides in a heat insulating pad material manufactured by a method which comprises: superposing a high-melting resin film on a molded foam produced by in-mold expansion molding of expandable resin beads on its fine-grained rough surface through the medium of a low-melting resin film; and melting the low-melting resin film thereby to laminate the high-melting resin film on the rough surface of the molded foam.

In order to heighten the production efficiency, this invention provides a method for manufacturing a heat insulating pad material which comprises molding a molded foam block having a required spreading area and thickness by in-mold expansion molding of expandable resin beads; slicing the block into a plurality of plates with an appropriate thickness and a fine-grained rough surface; superposing a high-melting resin film on the fine-grained rough surface of each of the plates though the medium of a low-melting resin film; melting the low-melting resin film thereby to laminate the high-melting resin film on the surface in a manner that the fine-grained rough surface can be seen through in a satin-like pattern.

Here, it is possible to positively emboss the foam cells constituting the rough surface of the molded foam or sliced plate in a textured pattern (of projections and depressions), when laminating the molded foam and the resin film, by applying heat, heating time and forcing pressure of a heating means for lamination, whereby the textured pattern is embossed on the surface of the resulting laminate.

According to another aspect of this invention, a heat insulating assembly for a battery is provided as a specific example of the use of such a heat insulating pad material as described above.

That is, the invention also resides in a heat insulating assembly for a battery which generally comprises a battery case having outer surrounding walls and a heat insulating pad made of a molded foam and configured to conform to the outer configuration of the surrounding walls of the battery case, the pad being fayed and secured to the surrounding walls and covering them.

More specifically, this invention consists in a heat insulating assembly for a battery which comprises a battery case provided, at lower positions and upper positions of outer surrounding walls thereof, with hook-like holding locks and lock pins protruding thereover, respectively, and a heat insulating pad formed with recesses conforming to the lock pins at its positions opposed to the positions of the lock pins, the heat insulating pad being made of a molded foam and configured to conform to the surrounding walls, the pad being mounted on the battery case at the outer surrounding walls in a manner that a bottom side of the pad is received in the holding locks of the battery case and the lock pins of the battery case are fitted in the recesses of the pad.

The heat insulating pad may be a one-piece pad member of a form commensurate with a developed figure of the surrouding walls or separate pad members independently formed conforming to the respective walls.

This invention is also characterized by a heat insulating assembly for a battery which comprises a battery case having outer surrounding walls of a generally quadrilateral form, spacer members projecting outwardly from corners of the outer surrounding walls thus forming spaces between respective adjacent spacer members and the respective walls, and heat insulating pad members of a molded foam fitted and held in the spaces to surround and cover the outer surrounding walls of the battery case.

The invention further provides a heat insulating assembly for a battery which comprises a battery case; a heat insulating one-piece pad member enclosing whole outer surrounding walls of the battery case, the pad member being constructed of a molded foam produced by in-mold expansion molding of expandable resin beads and a resin film laminated on the surface of the molded foam in a transparent fashion and configured in a form commensurate with a developed figure of the outer surrounding walls of the case; and a locking band fastened and secured to the pad member therearound. Also, a heat insulating assembly for a battery is provided, which comprises a battery case having outer surrounding walls; and a heat insulating one-piece pad member entirely enclosing the surrounding walls of the battery case and configured in a form commensurate with a developed figure of the surrounding walls, the pad member being constructed of an expansion-molded foam produced by in-mold expansion molding of expandable resin beads and a resin film laminated on the surface of the molded foam in a transparent fashion, the heat insulating pad member being spliced and interlocked at its both ends.

As the heat insulating pad for the foregoing heat insulating assemblies, a molded foam produced by extrusion molding can be also used, but more preferable is a single molded foam produced by in-mold expansion molding of expandable resin beads as well as a molded foam by in-mold expansion molding in the form of a laminate, whose methods of manufacture are described above.

As components for the heat insulating pad material, it is preferred that the molded foam, low-melting resin film and high-melting resin film be of the same kind of material or same series of materials, for example, polypropylene.

The method for manufacturing a heat insulating pad material according to this invention thus merely requires a very simple and easy procedure on account of the expansion molding and superposing steps and gives a satin-like pattern since the rough surface of the molded foam is transparent or diaphanous through the high-melting resin film in a pattern.

Further, production efficiency can be elevated by using a molded foam block, and recycling ability can be heightened by using a single kind of material for the molded foam, high-melting resin film and low-melting resin film.

Again, according to the heat insulating assembly for a battery pertaining to this invention, a variety of qualitative characteristics required for a battery, for the most part, can be satisfied, namely, heat retaining and heat insulating properties, prevention of embrittlement and prevention of electric discharge at low temperatures in the winter, prevention of evapotranspiration of the electrolyte by suppression of temperature rise at high temperatures in the summer, conformity of the pad to the battery, ease of dismounting and mounting of the pad during the changing of a discharged battery, resistance to oils, resistance to chemicals, prevention of adsorption of oils, water and dust and of absorption of water through the facing skin layer, a large thickness, an inexpensive cost, high-quality feeling, recycling ability because of a single material, etc.

BRIEF DESCRIPTION OF THE DRAWINGS

Examples of this invention will be hereinbelow described in more detail with reference to the accompanying drawings.

DESCRIPTION OF THE PREFERRED EMBODIMENTS

Figure 1:
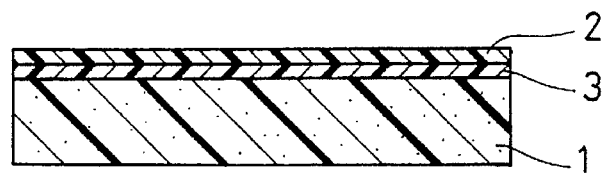
FIG. 1 is a schematic sectional view of one example of a pad material produced by a method of this invention showing films superposed on a molded foam.
Figure 2:
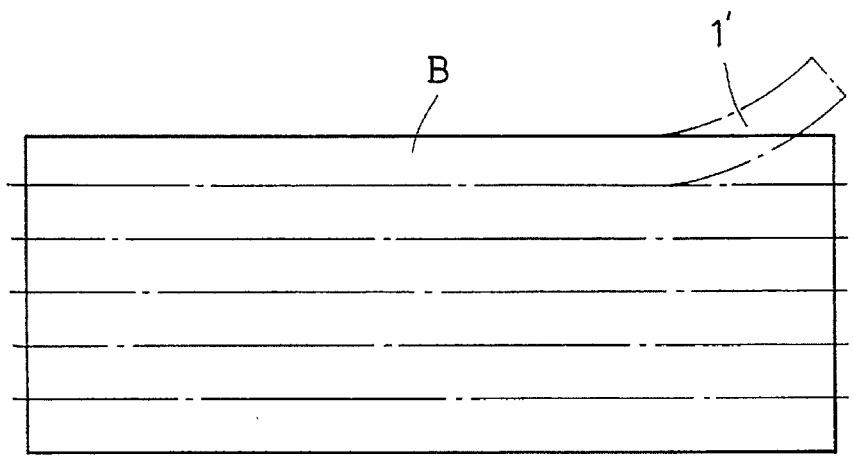
FIG. 2 is a schematic sectional view of an expansion molded foam in sliced state according to another example of a method of this invention.
Figure 3:
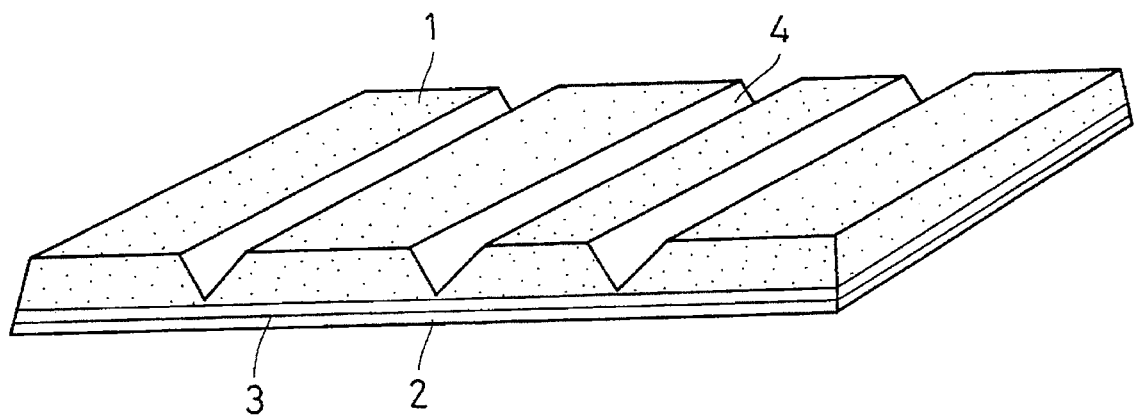
FIG. 3 is a diagrammatic perspective view of one example of a heat insulating pad material according to this invention used for a battery shield, developed in plane.

Referring to FIGS. 1 to 3, there are shown pad materials during the course of its manufacture and processed for use.

FIG. 1 illustrates an example of a pad material produced by a basic method of this invention, wherein a molded foam 1 produced by in-mold expansion molding of expandable resin beads and a high-melting resin film 2 are superposed through the medium of a low-melting resin film 3 on the surface of the molded foam 1.

In the molding of the foam 1, expandable resin beads as a starting material is filled in a mold cavity of male and female mold sections, shaped there by heating and fusion bonding, and cooled into a product. Here, it is possible to conduct the in-mold expansion molding to accommodate any configuration of the product as desired. For instance, it is readily possible to mold a battery shield surrounding four sides of the battery in a transversely elongated rectangular form so that its four folding corner portions are each formed in a thin-walled portion 4 as in FIG. 3 and whenever necessary, further to form an opening window at a protruding portion of the battery, e.g. a terminal.

As a resin for forming the molded foam, any resins capable of in-mold expansion molding can be used, for example, polyethylene-series resins, e.g. low-density polyethylene, high-density polyethylene, low-density linear polyethylene, ethylene-propylene copolymer, etc.; polypropylene-series resins, e.g. polypropylene homopolymer, propylene-ethylene random copolymer, propylene-ethylene block copolymer, propylene-ethylene-butene terpolymer, etc.; polystyrene-series resins, e.g. polystyrene, acrylonitrile-styrene copolymer, methacrylate-styrene copolymer, polystyrene-polyethylene copolymer, etc. Of the aforementioned resins, polyolefin resins such as polyethylene-series resins and polypropylene-series resins are used for general purposes, and particularly, polypropylene-series resins are the most useful.

The molded foam thus expansion molded in a mold cavity is usually formed with a surface having a turtleback like pattern due to the fusion-bonding of the expanded beads, and accordingly, has a fine-grained rough surface.

On the other hand, the low-melting resin film 3 and the high-melting resin film 2 to be superposed on the rough surface of the expansion-molded foam 1 include a thermoplastic resin film, for example, polyethylene film, polypropylene film, polyethylene terephthalate (PET) film, etc. The low-melting resin film 3 usually has a melting point of ca. 80° to 130° C., preferably ca. 100° to 120° C., whereas the high-melting resin film 2 usually has a melting point of 140° C. or upwards, more preferably 170° C. or upwards.

It is preferred that both the resin films 2,3 be the same type of resin or the same series of resins as far as possible.

Further, it is preferred that both the resin films 2,3 and the resin for the molded foam 1 be the same type of resin or the same series of resins.

Of the examples mentioned above, the most industrially feasible resin for the resin films 2,3 and the resin for the molded foam 1 is polypropylene, but naturally, this invention is by no means limited to this example.

The high-melting resin film 2 and the low-melting resin film 3 are stacked on the rough surface of the molded foam 1 while interposing the low-melting resin film 3. The low-melting resin film 3 is melted by heating it to a temperature exceeding the melting point thereof with the aid of a suitable heating means, thus laminating the high-melting resin film 2 to the surface of the molded foam 1. At that time, the fine-grained rough surface of the expansion-molded foam 1 is transparent or diaphanous through the high-melting resin film 2, presenting a beautiful unique appearance of a turtleback-like pattern or a satin-embossed pattern.

When laminating the high-melting resin film 2, it is effective to positively emboss the rough surface of the molded foam 1 in the cross-sectional direction of foam cells thereof by applying a heating temperature, heating time and forcing pressure of the heating means, thereby embossing a textured pattern (of projections and depressions) on the rough surface.

The foregoing example is concerned with a single molded foam 1 of a required shape, but it is also possible to mold a foam block B having a predetermined area and thickness and then to slice it in a thickness direction into a plurality of foam plates 1' with a required thickness.

FIG. 2 is an example where the block B of the molded foam is sliced into a plurality of the foam plates 1'. The forming of the block B makes it possible to manufacture a plurality of molded foams 1' of a required shape at one time by mere slicing and simultaneously to give a fine-grained rough cut surface. Thereafter, likewise as in the preceding example, onto the rough cut surface is superposed a high-melting resin film through the medium of a low-melting resin film, and then the high-melting resin film is laminated with the rough surface of the molded foam 1' by fusion bonding of the low-melting resin film, whereby a pattern like a satin-embossed pattern appears through the high-melting resin film. Thus, the surface appearance of the in-mold expansion molded foam is made aesthetically pleasing and accordingly, the range of use of the molded foam is enlarged.

Now several preferred embodiments where the heat insulating pad materials thus manufactured, as well as pad materials made of a molded foam produced by in-mold expansion molding or extrusion molding, are used for a battery shield and formed into a heat insulating assembly for a battery will be described hereinbelow.

According to this invention, for instance, the heat insulating pad material is formed as a one-piece development form of a battery shield as shown in FIG. 3, and folded at the thin-walled folding portions 4 to enclose the outer surface of the battery, thus yielding a heat insulating battery shield having a beautiful appearance, light weight, good workability upon mounting and dismounting, and other satisfactory qualitative characteristics required for a battery shield.

Figure 4A:
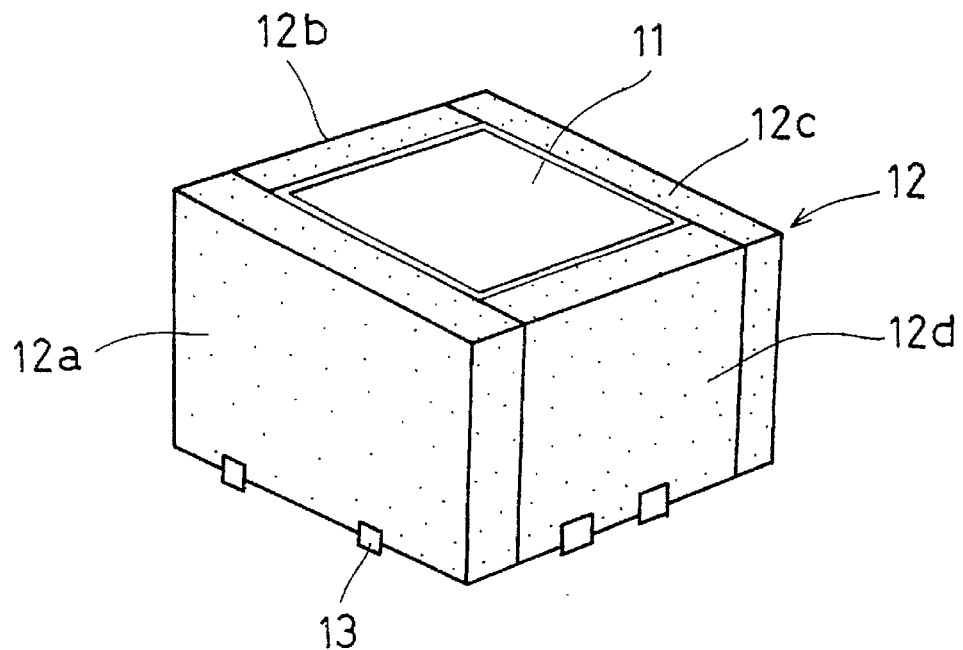
FIG. 4A and FIG. 4B are a perspective view and a partial sectional view, respectively, of one example of a heat insulating assembly for a battery pertaining to this invention.
Figure 4B:
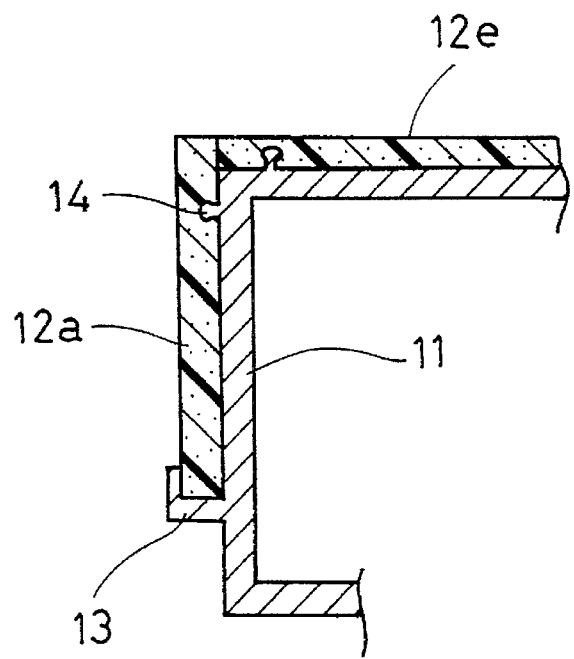

According to one embodiment, a heat insulating assembly for a battery is shown in FIG. 4A and FIG. 4B, in which the reference numeral 11 designates a battery case enclosing a battery therein, a heat insulating pad 12 is formed of separate pad members 12a to 12d made of a molded foam, and the pad members 12a to 12d are fayed and secured to the battery case 11, covering the outer surface walls thereof.

The battery case 11 is provided, at lower positions and upper positions of the outer surrounding walls thereof, with holding locks 13 for holding therein the pad members 12 and lock pins 14 projecting over the walls, respectively, so that the pad members 12a to 12d are fayed and secured to the battery case 11 with the bottoms thereof received in the holding locks 13 and the lock pins 14 fitted in the pad members. Here, the pad 12 is formed with recesses to facilitate fitting of the lock pins 14 into the pad 12. The reference numeral 12e is a top pad member.

Figure 5:
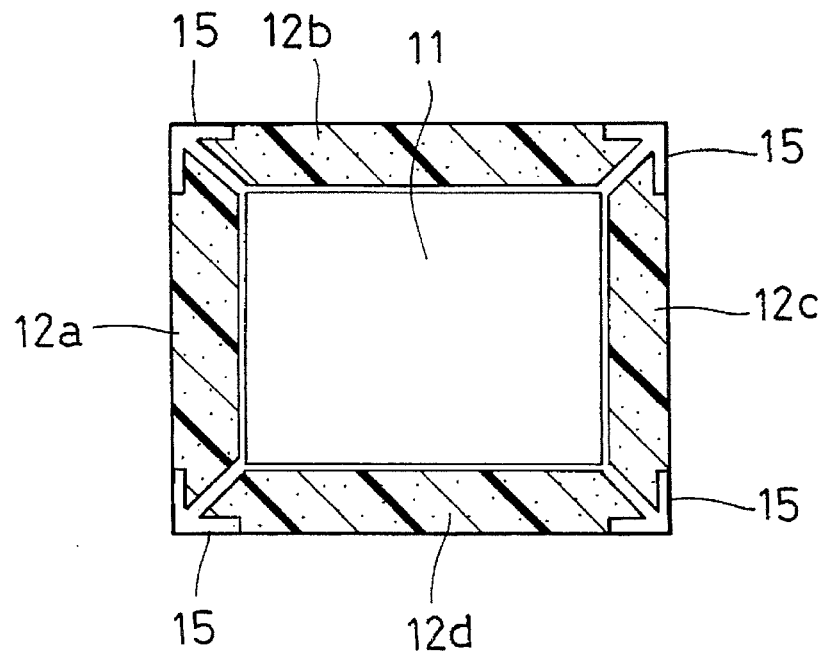
FIG. 5 is a horizontal sectional view of another example of a heat insulating assembly for a battery according to this invention.
Figure 6:
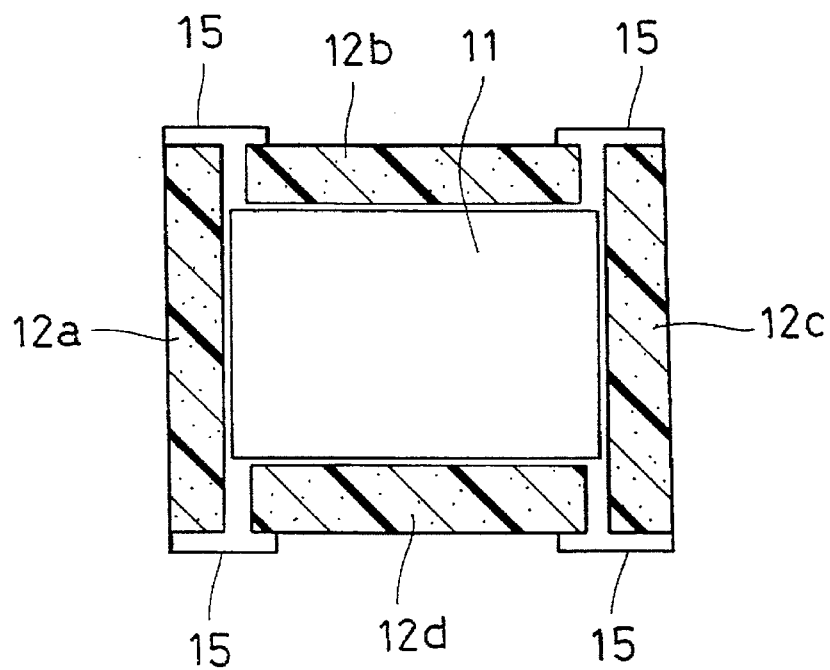
FIG. 6 is a horizontal sectional view of a further example of a heat insulating assembly according to this invention.

FIG. 5 and FIG. 6 are other examples of faying structures. In FIG. 5, spacer members 15 are formed, instead of the holding locks 13, to protrude outwardly of corners of respective adjacent surrounding walls of the battery case 11 in an arrow form so that spaces for holding pad members between the adjacent spacer members 15 are partitioned. The pad members 12a to 12d of a molded foam in a trapezoid form are fitted and held in the spaces whereby the pad members 12 are fayed and secured to the battery case 11.

In FIG. 6, instead of the arrow-form spacer members in FIG. 5, other spacer members 15 of a T-like form are provided to protrude in a dual hook-like manner, forming rectangular spaces between adjacent spacer members, in which pad members 12a to 12d are received and held.

The shape of the spacer members 15 is not limited to the examples above and any variation can be made. The spacer member is made of a resin or metal, preferably a polyolefin resin.

Figure 7:
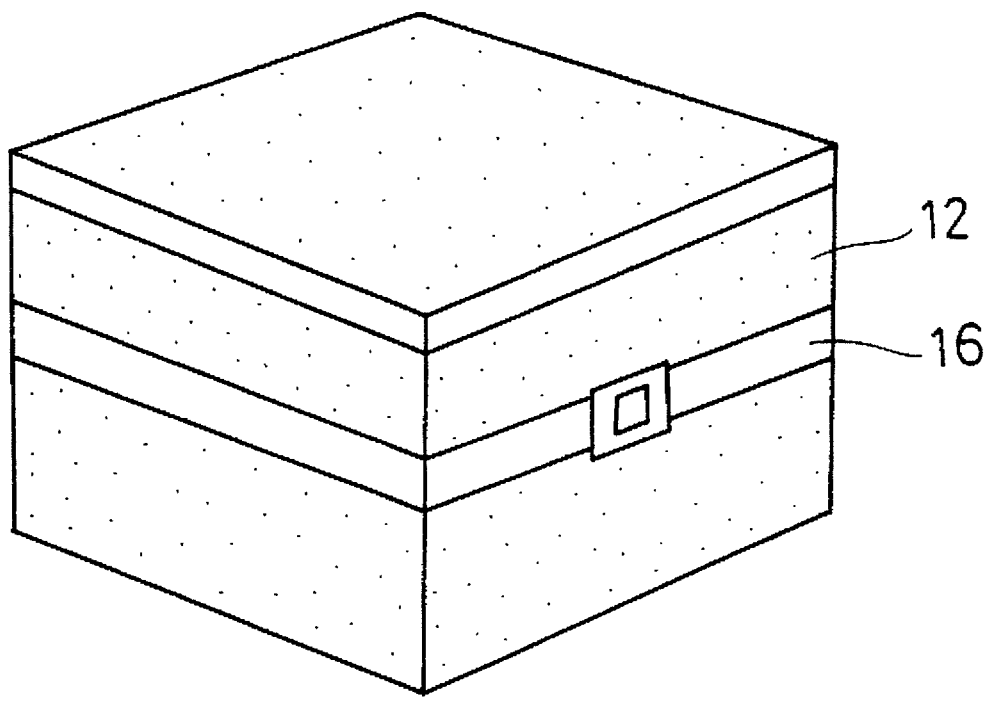
FIG. 7 is a perspective view of a still further example of a heat insulating assembly using a locking band according to this invention.

In the preceding examples, the pad 12 to be fayed to the battery case 11 is formed independently of plural members to the respective surrounding walls, but may be a one-piece member enclosing or surrounding all of the walls of the battery case. FIGS. 7 to 9 are such examples, wherein a one-piece pad member 12 is fayed to shield the battery case 11 and fastened with a locking band 16 or a locking tool 19.

Figure 8A:
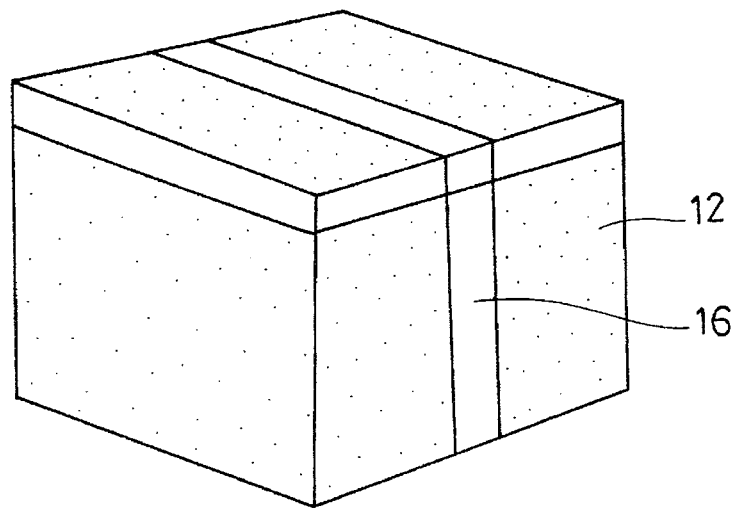
FIGS. 8A, 8B, and 8C are a perspective view of a variant to the example in FIG. 7, a diagrammatic view of another example of a locking band, and a sectional view showing a locking manner of the locking band, respectively.
Figure 8B:
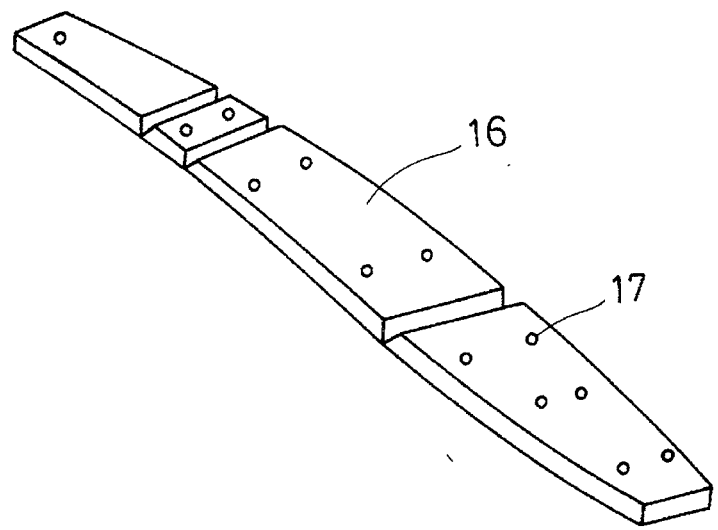
Figure 8C:
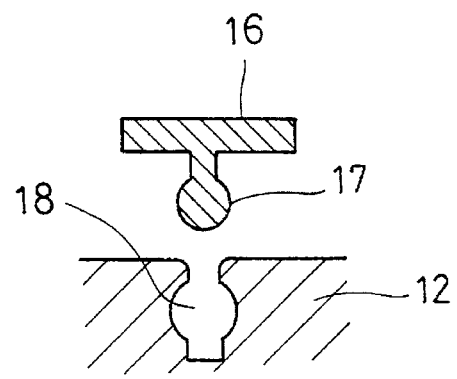
Figure 9A:
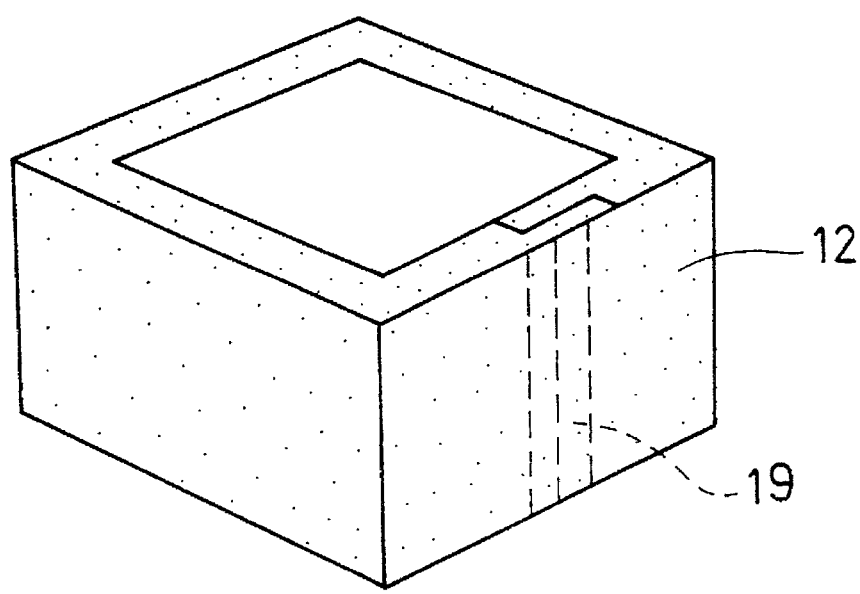
FIG. 9A and FIG. 9B are a perspective view of another example of a heat insulating assembly by means of a lock fastener thereof pertaining to the invention and an illustration showing the unlocked state of the locked ends, respectively.

As the locking band 16, a standard band for fastening by engagement at both ends thereof may be used as shown in FIG. 7 and FIG. 8A, but in order to ensure the fastening, press fitting means can be adopted, wherein the band 16 is provided with projections 17 as shown in FIG. 8B and the pad member 12 is formed with recesses 18 as shown in FIG. 8C so that the projections 17 may be press fitted in the recesses 18.

Figure 9B:
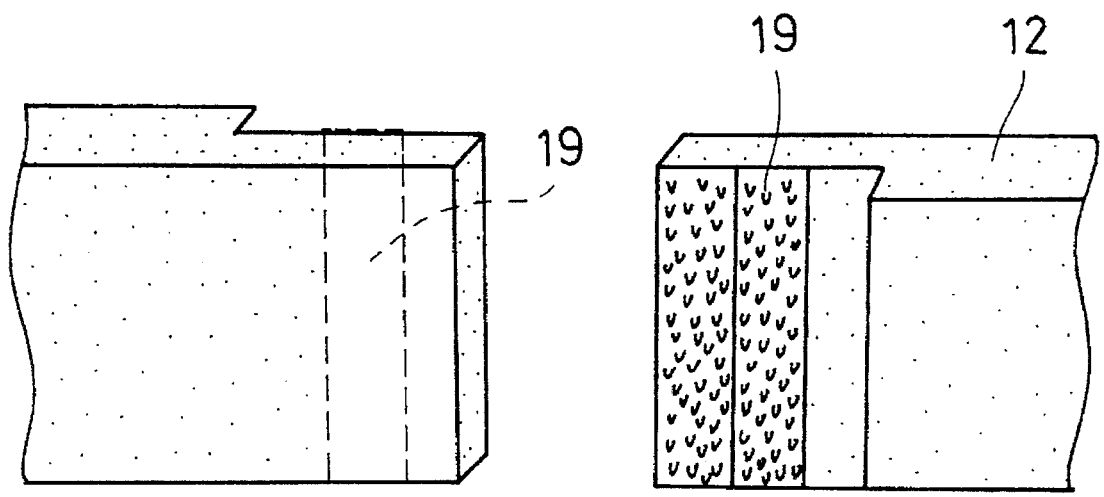

The locking tool 19 in FIG. 9B includes various known fastening means such as hooks, zippers, clips, snaps, etc. Here, by molding ends of the one-piece pad member 12 to be engaged to a slightly thin-wall form, a smooth and beautiful appearance is maintained.

In this manner, it is possible to attain a heat insulating effect by the faying construction of the pad 12 to the outer surrounding walls of the battery case 11.

The description so far made is concerned with the outer surrounding walls of a battery case, but it is naturally possible to use the pad material for a top face of the battery case where a terminal or a lid for an electrolyte liquid is present.

Where the pad 12 is formed as a one-piece member, it is configured in such a shape that a rectangular portion, which is a developed figure of the surrounding walls, is linked with a top face portion, whose positions for the terminal and the lid for the electrolyte are formed with openings.

The molded foam to be used for the pad material 12 of a heat insulating assembly includes extruded foams as well as in-mold expansion molded foams, but more preferable are in-mold expansion-molded foams, as described above.

The in-mold expansion-molded foam usually has a turtleback like pattern on its surface on account of the fusion-bonding of the expanded beads and accordingly, a fine-grained rough surface, and may be used singly in that form.

However, more preferably, it is used in a laminated form by superposing a high-melting resin film on a face of the molded foam through the medium of a low-melting resin film and melting the low-melting resin film to laminate the foam and the high-melting resin film, thus imparting a beautiful appearance. Otherwise, it is possible to melt a low-melting thermoplastic resin, such as a polyolefin, and coat it on the molded foam to thereby adhesive-bond (hot-melt) the facing film, thus making the appearane beautiful.

Thus, according to this invention, there is provided a heat insulating pad material constructed of a laminate which is manufactured by laminating a high-melting resin film on a fine-grained rough surface of a molded foam by in-mold expansion molding of expandable beads by the medium of a melted layer of low-melting resin film in a manner such that the fine-grained rough surface of the foam can be seen through the film like a satin-embossed pattern. As a consequence, a beautiful appearance is imparted.

Further, when the rough surface of the molded foam is positively embossed in a textured pattern, the pad material obtained has a wide variety of uses. Because of the molded product, the pad material can be configured in a variety of shapes as desired.

For instance, the pad material makes it easy to newly enter into many fields, such as a battery shield, for which there has been no suitable pad material hitherto and, accordingly, possible to provide a pad material required for a heat insulating assembly for a battery.

When a molded foam block to be sliced into plates is used, the production efficiency of the pad materials can be vastly elevated and a significant decrease in cost is attainable.

Again, according to this invention, the heat insulating pad material as described above, as well as molded foams produced by in-mold expansion molding of expandable resin beads or by extrusion molding, can be used for the heat insulation of batteries. In that case, it is possible to prevent electric discharge at low temperatures and to impede evapo-transpiration of the electrolyte by preventing temperature rise in the summer, and to attain a fitness to the battery, ease of changing a discharged battery, oil resistance, chemical resistance, prevention of adsorption of oils, water, dust into the surface skin layer, prevention of soaking of water, and other necessary characteristics. Where the molded foam and the resin films are formed of a single kind of material, a good recycling property is attained.

What is claimed is:

1. A heat insulating pad material comprising a molded polyolefin foam substrate having a mottled pattern on its surface and produced by in-mold expansion molding of expandable polyolefin beads; a facing layer of a polyolefin film having a melting point of at least 140° C.; and an intermediate layer of a polyolefin film having a melting point of 80° to 120° C. interposed between the substrate and the facing layer, the molded polyolefin foam substrate and the facing layer being laminated together through the intermediate layer in such a manner that the pattern of the molded polyolefin foam is transparent through the intermediate layer.

2. The heat insulating pad material as set forth in claim 1, wherein the facing layer is a polyolefin film having a melting point of at least 170° C. and the intermediate layer is a polyolefin film having a melting point of 100° to 120° C.

3. The heat insulating pad material as set forth in claim 1, wherein each of said polyolefins is polypropylene.

4. The heat insulating pad material as set forth in claim 1, wherein an embossed pattern is provided on its surface.

5. A heat insulating assembly for a battery, said assembly comprising a battery case having outer walls provided with, at lower and upper locations thereon, hook holding locks and lock pins protruding thereover, respectively; and a pad made of a molded polyolefin foam and formed with supplementary recesses for lockingly receiving the lock pins disposed at opposed positions to the lock pins, the pad being mounted on the outer walls of the battery case in such a manner that a bottom side of the pad is received in the holding locks and the lock pins of the battery case are lockingly received in the recesses of the pad, thus uniting the pad and the surrounding walls of the battery case together.

6. A heat insulating assembly for a battery comprising a battery case having outer walls of a generally quadrilateral shape; spacer members projecting outwardly from corners of the outer walls to form spaces between respective adjacent spacer members; and pad members fitted and held within the spaces in a manner such that they cover the outer walls of the battery, the pad members being made of a molded polyolefin foam.

7. The heat insulating assembly for a battery as set forth in claim 5, wherein the molded polyolefin foam has a mottled pattern on its surface produced by in-mold expansion molding of expandable polyolefin beads or by extrusion molding.

8. The heat insulating assembly for a battery as set forth in claim 6, wherein the molded polyolefin foam has a mottled pattern on its surface produced by in-mold expansion molding of expandable polyolefin beads or by extrusion molding.

9. The heat insulating assembly for a battery as set forth in claim 5, wherein the pad comprises a molded polyolefin foam having a mottled pattern on its surface produced by in-mold expansion molding of expandable polyolefin beads and one or more polyolefin layers are laminated on the surface of the foam.

10. The heat insulating assembly for a battery as set forth in claim 5, wherein the pad comprises a heat insulating pad material comprising a molded foam having a rough surface produced by in-mold expansion molding of expandable resin beads as a substrate; a facing of a high-melting resin film; and an intermediate melted layer of a low-melting resin film interposed between the molded foam on its rough surface side and the facing, the molded foam and the high-melting resin film being laminated together through the melted layer in such a manner that the rough surface of the molded foam is transparent through the high-melting resin film.

11. The heat insulating assembly for a battery as set forth in claim 6, wherein the pad is constructed of a molded polyolefin foam having a mottled pattern on its surface produced by in-mold expansion molding of expandable polyolefin beads and one or more polyolefin layers are laminated on the surface of the foam.

12. The heat insulating assembly for a battery as set forth in claim 6, wherein the pad comprises a heat insulating pad material comprising a molded foam having a rough surface produced by in-mold expansion molding of expandable resin beads as a substrate; a facing of a high-melting resin film; and an intermediate melted layer of a low-melting resin film interposed between the molded foam on its rough surface side and the facing, the molded foam and the high-melting resin film being laminated together through the melted layer in such a manner that the rough surface of the molded foam is transparent through the high-melting resin film.

13. The heat insulating assembly for a battery as set forth in claim 5, wherein said polyolefin is polypropylene.

14. The heat insulating assembly for a battery as set forth in claim 5, wherein the pad comprises a one-piece pad member configured to conform to the outer walls or separate pad members independently configured to conform to respective outer walls.

15. The heat insulating assembly for a battery as set forth in claim 6, wherein said polyolefin is polypropylene.

16. A heat insulating assembly for a battery comprising a battery case having outer walls; a one-piece pad member entirely enclosing the outer walls, the one-piece pad member being configured to conform to the battery case outer walls and constructed of a molded polyolefin foam having a mottled pattern on its surface produced by in-mold expansion molding of expandable polyolefin beads and a polyolefin film laminated together in a manner such that the pattern of the foam is transparent through the film; and a locking band fastened and secured around an outer perimeter of the pad member.

17. A heat insulating assembly for a battery comprising: a battery case having outer walls and a one-piece pad member entirely enclosing the outer walls, the one-piece pad member being configured to conform to the battery case outer walls and constructed of a molded polyolefin foam having a mottled pattern on its surface produced by in-mold expansion molding of expandable polyolefin beads and a polyolefin film laminated together in a manner such that the pattern of the foam is transparent through the film, the pad member having mutually engageable ends at both sides thereof and is spliced at its ends and secured to the battery case.

* * * * *